US008623402B2

(12) United States Patent
Delcour (10) Patent No.: US 8,623,402 B2
(45) Date of Patent: Jan. 7, 2014

(54) NON-STARCH-POLYSACCHARIDES

(75) Inventor: Jan Delcour, Heverlee (BE)

(73) Assignee: Cargill, Incorporated, Wayzata, MN (US)

( * ) Notice: Subject to any disclaimer, the term of this patent is extended or adjusted under 35 U.S.C. 154(b) by 911 days.

(21) Appl. No.: 10/487,184

(22) PCT Filed: Aug. 19, 2002

(86) PCT No.: PCT/BE02/00137
§ 371 (c)(1),
(2), (4) Date: Feb. 19, 2004

(87) PCT Pub. No.: WO03/015533
PCT Pub. Date: Feb. 27, 2003

(65) Prior Publication Data
US 2004/0234672 A1   Nov. 25, 2004

(30) Foreign Application Priority Data

Aug. 20, 2001 (GB) .................................. 0120159.9
Mar. 28, 2002 (GB) .................................. 0207367.4

(51) Int. Cl.
*A23K 1/17* (2006.01)
(52) U.S. Cl.
USPC ....................................................... 424/442
(58) Field of Classification Search
USPC ....................................................... 424/442
See application file for complete search history.

(56) References Cited

U.S. PATENT DOCUMENTS

| | | | |
|---|---|---|---|
| 4,494,530 A | 1/1985 | Jansma et al. | |
| 5,362,502 A | 11/1994 | Slade et al. | |
| 5,429,828 A * | 7/1995 | Fodge et al. | 426/18 |
| 5,614,501 A | 3/1997 | Richards | |
| 5,622,738 A | 4/1997 | Takeuchi et al. | |
| 6,033,712 A | 3/2000 | Greenshields et al. | |
| 6,132,716 A * | 10/2000 | Morgan et al. | 424/94.61 |
| 6,147,206 A | 11/2000 | Doner et al. | |
| 6,162,473 A | 12/2000 | Fodge et al. | |
| 6,558,930 B2 * | 5/2003 | Hwang et al. | 435/101 |
| 6,720,014 B1 * | 4/2004 | Short et al. | 426/52 |
| 7,033,633 B2 * | 4/2006 | Poulsen et al. | 426/549 |
| 2001/0020091 A1 * | 9/2001 | Buchanan et al. | 536/123 |
| 2002/0195213 A1 | 12/2002 | Izumi et al. | |
| 2010/0035302 A1 | 2/2010 | Broekaert et al. | |
| 2011/0020498 A1 | 1/2011 | Broekaert et al. | |

FOREIGN PATENT DOCUMENTS

| | | |
|---|---|---|
| EP | 0 856 259 A1 | 8/1998 |
| EP | 0 904 784 A1 | 3/1999 |
| EP | 1 175 905 A1 | 1/2002 |
| EP | 0 463 706 B1 | 3/2003 |
| EP | 0463706 B1 | 3/2003 |
| EP | 1 137 424 B1 | 4/2004 |
| EP | 1 418 819 B1 | 11/2005 |
| FR | 2811997 | 1/2002 |
| JP | 02-001701 | 1/1990 |
| JP | 2303459 | 12/1990 |
| JP | 4309501 A | 11/1992 |
| JP | 5112455 A | 5/1993 |
| JP | 06217761 | 8/1994 |
| JP | 10120704 | 5/1998 |
| JP | 10237107 | 9/1998 |
| JP | 2000-501935 | 2/2000 |
| JP | 2005-500807 | 1/2005 |
| WO | WO 91/04673 | 4/1991 |
| WO | WO 95/23514 | 9/1995 |
| WO | WO 96/06935 | 3/1996 |
| WO | WO 97/09423 | 3/1997 |
| WO | WO 97/20920 | 6/1997 |
| WO | WO 97/27293 A1 | 7/1997 |
| WO | WO 98/54305 | 12/1998 |
| WO | WO 99/30570 * | 6/1999 ............... A23K 1/00 |
| WO | WO 99/30570 A1 | 6/1999 |
| WO | WO 01/33973 A2 | 5/2001 |
| WO | WO 01/42433 A2 | 6/2001 |
| WO | WO 01/67891 A1 | 9/2001 |
| WO | WO 01/89317 A2 | 11/2001 |
| WO | WO 02/24926 A1 | 3/2002 |
| WO | WO 02/051264 A2 | 7/2002 |
| WO | WO 02/067698 * | 9/2002 ............... A23L 1/10 |
| WO | WO 02/067698 A1 | 9/2002 |
| WO | WO 2006/002495 A1 | 1/2006 |
| WO | WO 2006/027529 A2 | 3/2006 |
| WO | WO 2008/000050 A2 | 1/2008 |
| WO | WO 2008/098320 A1 | 8/2008 |
| WO | WO 2009/117790 A2 | 10/2009 |

OTHER PUBLICATIONS

Choct M. et al. Anti-nutritive effect of wheat pentosans in broiler chickens: roles of viscosity and gut microflora, Br Poult Sci. Sep. 1992;33(4):821-34.*
Michael Bedford et al., Reduction of Intestinal Viscosity through Manipulation of Dietary Rye and Pentosanase Concentration is Effected through Changes in the Carbohydrate Composition of the Intestinal Aqueous Phase and Results in Improved Growth Rate and Food Conversion Efficiency of Broiler Chicks, J. Nutr. 122: 560-569, 1992.*
Grootwassink et al. Fractionation of crude pentosanase (arabinoxylanase) for improvement of the nutritional value of rye diets for broiler chickens, vol. 46 Issue 3, pp. 289-300).*
Bedford, M.A., "Factors Influencing the Use of Enzymes in Cereal-Based Diets", *Recent Advances in Enzymes in Grain Processing*, 19:1-9.

(Continued)

*Primary Examiner* — Jake Vu
(74) *Attorney, Agent, or Firm* — Clark & Elbing LLP (57) ABSTRACT

The present invention relates to compositions of low molecular mass arabinoxylans for use as dietary supplements and to methods of improving growth performance and feed utilization of animals through the supplementation of their diets with the said compositions. In a preferred embodiment, the low molecular mass arabinoxylans are derived from natural sources, such as plant material and more preferably of cereals. They can be selected fractions of said natural arabinoxylans or can be obtained by acid and/or enzymatic depolymerization or fragmentation of said natural arabinoxylans or they can be structural analogues produced by chemical and/or physical processes.

22 Claims, 2 Drawing Sheets

(56) References Cited

OTHER PUBLICATIONS

Boros, D. et al., "Improvement of Nutritional Value of Rye by Enzyme Application", *Hodowla Roslin Aklimatyzacja I Nasiennictwo*, 38:95-110 (1994).
Choct, M., "Feed Non-Starch Polysaccharides: Chemical Structures a Significance", *ASA Southeast Asia*, p. 1-9.
Choct, M. et al., "Anti-Nutritive Effect of Wheat Pentosans in Broiler Chickens: Roles of Viscosity and Gut Microflora", *Bristish Poultry Science*, 33:821-834 (1992).
Choct, M. et al., "Non-Starch Carbohydrates: Digestion and its Secondary Effects in Monogastrics", *Proceedings of the Nutrition Society of Australia*, 24:31-38 (2000).
Courtin, C.M. et al., "Physicochemical and Bread-Making Properties of Low Molecular Weight Wheat-Derived Arabinoxylans", *J. Agric. Food Chem.*, 46:4066-4073 (1998).
Pawlik, J.R. et al., Improvement of the Nutritional Value of Rye by the Partial Hydrolysis of the Viscous Water-Soluble Pentosans Following Water-Soaking or Fungal Enzyme Treatment, *British Poultry Science*, 31:525-538 (1990).
Bird, "Performance Improvements Following Enzyme Supplementation of Wheat- and Barley- Based Poultry Diets." in *Enzymes in Poult Swine Nutr.edited by Marquardt and Han* 73-87 (1997).
Choct and Annison, "Anti-Nutritive Effect of Wheat Pentosans in Broiler Chickens: Roles of Viscosity and Gut Microflora," *Br Poult Sci*. 33(4):821-834 (1992).
Choct and Kocher. "Non-Starch Carbohydrates: Digestion and its Secondary Effects in Monogastrics," *Proc Nutr Soc Aust*. 24:31-38 (2000).
Courtin and Delcour, "Physicochemical and Bread-Making Properties of Low Molecular Weight Wheat-Derived Arabinoxylans," *J Agric Food Chem*. 46:4066-4073 (1998).
Egi et al., "Arabinoxylans and Their Behavior During Malting and Brewing," *MBAA TQ* 41(3):248-267 (2004).
Knudsen and Hansen, "Gastrointestinal Implications in Pigs of Wheat and Oat Fractions, 1. Digestibility and Bulking Properties of Polysaccharides and other Major Constituents" *Br J Nutr.* 65(2):217-232 (1991).
Mroz et al., "Effects of Dietary Carbohydrates and Buffering Capacity on Nutrient Digestibility and Manure Characteristics in Finishing Pigs," *J Anim Sci.* 78(12):3096-3106 (2000).
Pawlik et al., "Improvement of the Nutritional Value of Rye by the Partial Hydrolysis of the Viscous Water-Soluble Pentosans Following Water-Soaking or Fungal Enzyme Treatment," *Br Poult Sci.* 31(3):525-538 (1990).
Reply to the Official Communication Under A96(2) for EP 02766984.5, dated Jul. 1, 2004.
Rijnen et al., "Effects of Dietary Fermentable Carbohydrates on Energy Metabolism in Group-Housed Sows," *J Anim Sci.* 79(1):148-154 (2001).
Schooneveld-Bergmans et al., "Physicochemical Characteristics of Wheat Bran Glucuronoarabinoxylans," *J Cereal Sci.* 29(1):49-61 (1999).
Shiiba et al., "Purification and Characterization of Two Arabinoxylans From Wheat Bran," *Cereal Chem.* 70(2):209-214 (1993).
Voragen, "The Cell Wall and Its Components in Cereals and Pulse Grains, Consequences on Nutritional Value." *Cah Options Mediterr.* 26:119-123 (1997).
Annison et al., "Analysis of Wheat Arabinoxylans from a Large-Scale Isolation," *Carbohydr. Polym.* 19:151-159 (1992).
Bedford and Classen, "Reduction of Intestinal Viscosity through Manipulation of Dietary Rye and Pentosanase Concentration is Effected Through Changes in the Carbohydrate Composition of the Intestinal Aqueous Phase and Results in Improved Growth Rate and Food Conversion Efficiency of Broiler Chicks," *J. Nutr.* 122:560-569 (1992).
Brennan, J.P. and Singh, R.P. 2000, *Economic Assessment of Improving Nutritional Characteristics of Feed Grains*, Report prepared for Grains Research and Development Corporation, Economic Research Report No. 3, Wagga Wagga.
Hoffmann et al., "H-N.m.r. Study of Enzymically Generated Wheat-Endosperm Arabinoxylan Oligosaccharides: Structures of Hepta- to Tetradeca-Saccharides Containing Two or Three Branched Xylose Residues," *Carbohydr. Res.* 223:19-44 (1992).
Kitta (Shigeki Kitta, Executive General Manager, Consumer Health Products Division, Suntory Limited Dojimahama 2-1-40, Kita-ku, Osaka, Osaka 530-8203, Japan). "Beginning of Sales," [Letter]. Letter to: Joseph Fockedey (Cosucra, Rue de la Sucrerie, 1, 7740 Warcoing, Belgium). Sep. 5, 2007.
Kontula et al., "Oat Bran β-gluco- and xylo-oligosaccharides as Fermentative Substrates for Lactic Acid Bacteria," *Int. J. Food Microbial.* 45:163-169 (1998).
Loo et al., "Functional Food Properties of Non-Digestible Oligosaccharides: A Consensus Report from the ENDO Project (DGXII AIRII-CT94-1095)," *Br. J. Nutr.* 81(2):121-132 (1999).
Majerowicz, (Bredema, 38 Avenue de l'Opéra 75002 Paris, France, mm@bredema.com); Joseph Fockedey (Cosucra, Rue de la Sucrerie, 1, 7740 Warcoing, Belgium, Jfockedey@cosucra.com ). "Opposition au Brevet EP 1 418 819 B1," [electronic mail on the internet]. Message to: Stephanie Patarin (Bredema, 38 Avenue de l'Opéra 75002 Paris, France; stp@bredema.com) and Eric Enderlin (Bredema, 38 Avenue de l'Opéra 75002 Paris, France; een@bredema.com), Marc Majerowicz, (Bredema, 38 Avenue de l'Opéra 75002 Paris, France; mm@bredema.com), Yann Dugenet (yann.dugenet@wanadoo.com), Mingan Choct (Professor (seconded to Poultry CRC), Faculty of Arts and Sciences, School of Environmental and Rural Sciences, University of New England, Armidale NSW 2351 Australia, mchoct@une.edu.au), Joseph Fockedey (Cosucra, Rue de la Sucrerie, 1, 7740 Warcoing, Belgium; Jfockedey@cosucra.com ). Sep. 10, 2007, 9:45 AM. French and English languages. The product is a food additive containing about 70 of arabinoxylans, having a molecular mass between 5000 and 758000, and is obtained in the starch industry by wet milling.
Piccioni, "Dictionnaire Des Aliments Pour Les Animaux," *Edagricole* 419-420 (1965).
Prosky et al., "Methods to Determine Food Inulin and Oligofructose," *J. Nutr.* 129(Suppl):1418S-1423S (1999).
Roberfroid and Slavin, "Nondigestible Oligosaccharides," *Crit.Reviews Food Sci. Nutr.* 40(6):461-480 (2000).
Rokey, G.J., "Petfood and Fishfood Extrusion," *The Technology of Extrusion Cooking* 144-145 (1995).
Swennen, "Production, Characterisation and Functionality of Arabinoxylooligosaccharides with Different Structures," Katholieke Universiteit Leuven, Ph.D. thesis (2007).
Van Laere et al., "Fermentation of Plant Cell Wall Derived Polysaccharides and Their Corresponding Oligosaccharides by Intestinal Bacteria," *J. Agric. Food Chem.* 48(5):1644-1652 (2000).
Yamada et al., "Structure and Properties of Oligosaccharides from Wheat Bran," *Cereal Foods World* 38(7):490-492 (1993).
Yamada et al., "Preparation of a New Arabinoxylooligosaccharide from Wheat Bran Hemicellulose and Its Structure," *Biosci. Biotech. Biochem.* 58(2):288-292 (1994).
"Cuisson-Extrusion De Nombreuses Applications," *Cap Sur Les Nouvelles Technologies*, 1040:24 and 28 (1986).
Data Sheet of Pentopan® Mona BG, Novozymes A/S Denmark (2008).
Data Sheet of Cellulase <Onozuka> RS from Trichoderma viride, Copyright 2007/SERVA GmbH.
www.asasea.com abstract, "Cereal Grains and Their By-Products," printed Mar. 20, 2003.
Abe et al., "Effect of Administration of Bifidobacteria and Lactic Acid Bacteria to Newborn Calves and Piglets," *J. Dairy Sci.* 78:2838-2846 (1995).
Bonneau and Laarveld, "Biotechnology in Animal Nutrition, Physiology and Health," *Livest. Prod. Sci.* 59:223-241 (1999).
Close, "Producing Pigs Without Antibiotic Growth Promoters," *Advances in Pork Production* 11:47-56 (2000).
Courtin et al., "Dietary Inclusion of Wheat Bran Arabinoxylooligosaccharides Induces Beneficial Nutritional Effects of Chickens," *Cereal Chem.* 85(5):607-613 (2008).
Kurmann and Rasic, Chapter 6, "The Health Potential of Products Containing Bifidobacteria," in Therapeutic Properties of Fermented Milks, Robinson ed., pp. 117-157 (1991).

(56) References Cited

OTHER PUBLICATIONS

Modler, "Bifidogenic Factors—Sources, Metabolism and Applications," *Int. Daily J.* pp. 383-389 and 391-407 (1994).
Ross Tech 99/37, "Role of Antibiotic as Growth Promoter," printout from world.rossbreeders.com (1999); cited in opposition of European Patent Application No. EP 02766984.5 on Aug. 17, 2009.
Office Action for Canadian Application No. 2,456,304, dated Dec. 18, 2009.
Office Action for Indian Application No. 417/DELNP/2004, dated Feb. 4, 2010.
English Language Translation of the Office Action issued in connection with Chinese Patent Application No. 200580022193, dated Feb. 12, 2010.
Aust et al., "Estimation of Available Energy of Dietary Fibres by Indirect Calorimetry in Rats," *Eur. J. Nutr.* 40:23-29 (2001).
Glitsø et al., "Degradation of Rye Arabinoxylans in the Large Intestine of Pigs," *J. Sci. Food Agric.* 79:961-969 (1999).
Livesey, "The Energy Values of Dietary Fibre and Sugar Alcohols for Man," *Nutr. Res. Rev.* 5(1):61-84 (1992).
Smith et al., "Energy Balance and Thermogenesis in Rats Consuming Nonstarch Polysaccharides of Various Fermentabilities," *Am. J. Clin. Nutr.* 68(4):802-819 (1998).
Office Action for Australian Patent Application No. 2005259856, dated Mar. 11, 2010.
Official Communication from the European Patent Office for European Patent Application 05758958.2, dated Dec. 28, 2010.
*Association des Amidonneries de Céréales de l'Union Européenne*, printout from http://www.authorstream.com/Presentation/miloung-16703-7-Labelling-wheat-starch-derivatives-AAC-members-Why-new-EU-rules-specific-forwheat-seedcount-presentation-002-News-Reports-ppt-powerpoint/, "Changes in the EU Labeling Legislation," (Nov. 19, 2003).
Beaugrand et al., "Impact and Efficiency of GH10 and GH11 Thermostable Endoxylanases on Wheat Bran and Alkali-Extractable Arabinoxylans," *Carbohydrate Research* 339:2529-2540 (2004).
Brief filed on behalf of DF3 SAS and Cosucra Groupe Warcoing in opposition of EP 1 758 470, dated Feb. 17, 2011, including Annex 1 and Annex 2.
Burton-Freeman, "Dietary Fiber and Energy Regulation," *J. Nutr.* 130(2S Suppl.): 272S-275S (2000).
Caprita et al., "Biochemical Aspects of Non-Starch Polysaccharides," *Scientific Papers: Animal Science and Biotechnologies* 43:368-375 (2010).
Carvalheiro et al., "Optimization of Brewery's Spent Grain Dilute-Acid Hydrolysis for the Production of Pentose-Rich Culture Media," *Appl. Biochem. Biotechnol.* 113-116:1059-1072 (2004). (Abstract only).
Clayton, "The Extraction and Ion-Exchange Chromatography of Buffer-Soluble and Gluten Proteins of Wheat Flour," *Cereal Chemistry* 43:495-516 (1966).
Cloetens et al., "The Bifidogenic Potential of Arabinoxylo-Oligosaccharides in Healthy Volunteers Depends on the Degree of Polymerisation," Abstract W1382, *Gastro.* 134(4):A-692 (2008).
Cloetens et al., "The Effect of Two Different Doses of Arabinoxylo-Oligosaccharides and Oligofructose Enriched Inulin on the Colonic Ammonia Metabolism in Healthy Volunteers," Abstract W1383, *Gastro.* 134(4): A-693 (2008).
Cloetens, "In Vivo Evaluation of the Gastrointestinal Effects of Arabinoxylan-Oligosaccharides in Healthy Subjects," *Doctoral Thesis in Medical Sciences, Katholieke Universiteit Leuven, Belgium* (Apr. 28, 2009).
Communication from Examiner for GB Application No. 0612976.1, dated Nov. 1, 2006.
Courtin et al., "Determination of Reducing End Sugar Residues in Oligo- and Polysaccharides by Gas—Liquid Chromatography", *Journal of Chromatography A*, 866:97-104 (2000).
Crittenden et al., "In Vitro Fermentation of Cereal Dietary Fibre Carbohydrates by Probiotic and Intestinal Bacteria," *J. Sci. Food Agric.* 82:781-789 (2002).
De Preter et al., "The In Vivo Use of the Stable Isotope-Labelled Biomarkers Lactose-[$^{15}$N]ureide and [$^2$H$_4$]Tyrosine to Assess the Effects of Pro- and Prebiotics on the Intestinal Flora of Healthy Human Volunteers," *British Journal of Nutrition* 92:439-446 (2004).
E-mail Communication between Joël Bazin of Novozymes France S.A. and Joseph Fockedey of Cosucra Groupe Warcoing and its English translation, dated Sep. 1, 2010 and Sep. 6, 2010.
Fang et al., "Influence of Temperature on the Retention Behaviour of Proteins in Cation-Exchange Chromatography," *Journal of Chromatography A*, 729(1-2):49-66 (1996). (Abstract only).
Fastinger, "Development of a Novel Value-Added Distillers Dried Grains with Solubles: Effects on Amino Acid and Energy Digestibility in Pigs," Dissertation, Ohio State University, 2005.
Faulds et al., "Specificity of Feruloyl Esterases for Water-Extractable and Water-Unextractable Feruloylated Polysaccharides: Influence of Xylanase," *Journal of Cereal Science* 38:281-288, 2003.
Grootaert et al., "Microbial Metabolism and Prebiotic Potency of Arabinoxylan Oligosaccharides in the Human Intestine," *Trends in Food Science & Technology* 18:64-71, 2007.
Hoffmann et al., "Structural Characteristics of the Warm-Water-Soluble Arabinoxylans from the Tailings of the Soft Wheat Variety Kadet," *Carbohydrate Polymers* 16:275-289 (1991).
Instruction Manual for Cellulase "Onozuka" R-10 from *Trichoderma viride* cited in brief filed on behalf of DF3 SAS and Cosucra Groupe Warcoing in opposition of EP 1 758 470, dated Feb. 17, 2011.
International Preliminary Report on Patentability for PCT/BE2007/000072, issued Jan. 6, 2009, mailed Jan. 15, 2009.
International Preliminary Report on Patentability for International Application No. PCT/BE2009/000020 dated Mar. 18, 2010 (date of completion and mailing of report).
International Search Report and Written Opinion for PCT/BE2007/000072, mailed Jan. 29, 2008.
International Search Report for International Application No. PCT/BE2009/000020 dated Sep. 23, 2009 (date of completion of search) and Oct. 13, 2009 (date of mailing of report).
Katapodis and Christakopoulos, "Enzymic Production of Feruloyl Xylo-Oligosaccharides from Corn Cobs by a Family 10 Xylanase from *Thermoascus aurantiacus*," *LWT* 41:1239-1243 (2008), e-published Sep. 1, 2007.
Maes et al., "Relative Activity of Two Endoxylanases Towards Water-Unextractable Arabinoxylans in Wheat Bran," *Journal of Cereal Science* 39:181-186 (2004).
Maes, "Structural Features of Wheat (*Triticum aestivum*) Bran Arabinoxylan Fractions Extracted with Endoxylanases or Alkaline Media," *Doctoral Dissertation in Agriculture, Katholieke Universiteit Leuven, Belgium* (Aug. 2004).
Moers et al., "Endoxylanase Substrate Selectivity Determines Degradation of Wheat Water-Extractable and Water-Unextractable Arabinoxylan," *Carbohydrate Research* 340:1319-1327, 2005.
Mul and Perry, "The Role of Fructo-Oligosaccharides in Animal Nutrition," In *Recent Advances in Animal Nutrition, Proceedings of the 28$^{th}$ University of Nottingham Feed Conference*, Cole ed., Nottingham University Press, pp. 57-79 (1994).
Office Action for European Patent Application No. EP 07 784 889.3, dated Jun. 24, 2009.
Official Communication from European Patent Office for European Patent Application 07 784 889.3, dated Dec. 9, 2010.
Official Communication from the European Patent Office for European Patent Application No. 09725460.1, dated Feb. 15, 2011.
Official Communication from the European Patent Office for European Patent Application No. 09725460.1, dated Feb. 21, 2011.
Official Communication from the European Patent Office for European Patent Application No. 09725460.1, dated Feb. 28, 2011.
Purolite Company, "Corn Sweetener Refining with Ion Exchange Resins," (2007).
Reply to Written Opinion for International Patent Application No. PCT/BE2009/000020 dated Jan. 29, 2010.
Roberts et al., "The Influence of Dietary Composition on Energy Intake and Body Weight," *J. Am. Coll. Nutr.* 21(2): 140S-145S (2002).
Search Report for GB Application No. 0612976.1, mailed Oct. 30, 2006, date of search Oct. 27, 2006.

(56) References Cited

OTHER PUBLICATIONS

Sørensen et al., "Efficiencies of Designed Enzyme Combinations in Releasing Arabinose and Xylose from Wheat Arabinoxylan in an Industrial Ethanol Fermentation Residue," *Enzyme and Microbial Technology* 36:773-784, 2005.

Sørensen et al., "Optimization of Reaction Conditions for Enzymatic Viscosity Reduction and Hydrolysis of Wheat Arabinoxylan in an Industrial Ethanol Fermentation Residue," *Biotechnol. Prog.* 22:505-513, 2006.

Supplemental Search Report for British Application No. GB0612976.1, dated Nov. 1, 2006.

Swennen et al., "Large-Scale Production and Characterisation of Wheat Bran Arabinoxylooligosaccharides," *J. Science and Food Agric.* 86(11):1722-1731 (2006).

Swennen et al., "Ultrafiltration and Ethanol Precipitation for Isolation of Arabinoxylooligosaccharides with Different Structures," *Carbohydrate Polymers* 62:283-292 (2005).

Van Craeyveld et al., "Structurally Different Wheat-Derived Arabinoxylooligosaccharides Have Different Prebiotic and Fermentation Properties in Rats", *Journal of Nutrition* 138:2348-2355 (2008).

Written Opinion of the International Searching Authority of International Application No. PCT/BE2009/000020 dated Sep. 23, 2009 (date of completion of this opinion) and Oct. 13, 2009 (date of mailing of this opinion).

Yuan et al., "Antioxidant Activity of Feruloylated Oligosaccharides from Wheat Bran," *Food Chemistry* 90:759-764 (2005).

Odetallah et al., "Effect of Mannan-Endo-1,4-β-Mannosidase on the Growth Performance of Turkeys Fed Diets Containing 44 and 48% Crude Protein Soybean Meal[1,2]" *Poultry Science* 81:1322-1331 (2002).

*Stedman's Medical Dictionary* 27th Edition Lippincott Williams & Wilkins p. 1062 (2000).

Grootwassink et al. Fractionation of crude pentosanase (arabinoxylanase) for improvement of the nutritional value of rye diets for broiler chickens, vol. 46 Issue 3, pp. 289-300), 1989.

\* cited by examiner

NON-STARCH-POLYSACCHARIDES

CROSS REFERENCE TO RELATED APPLICATIONS

This application is the U.S. National Stage of International Application No. PCT/BE02/00137, filed Aug. 19, 2002, which was published in English under PCT Article 21(2), and which claims the benefit of British patent application 0120159.9, filed Aug. 20, 2001 and British patent application 0207367.4, filed Mar. 28, 2002.

FIELD OF THE INVENTION

The present invention relates to compositions of low molecular mass arabinoxylans for use as dietary supplements and to methods of improving growth performance and feed utilisation of animals through the supplementation of their diets with the said compositions. In a preferred embodiment, the low molecular mass arabinoxylans are derived from natural sources, such as plant material and more preferably of cereals. They can be selected fractions of said natural arabinoxylans or can be obtained by acid and/or enzymic depolymerisation or fragmentation of said natural arabinoxylans or they can be structural analogues produced by chemical and/or physical processes.

BACKGROUND OF THE INVENTION

Figure 1:
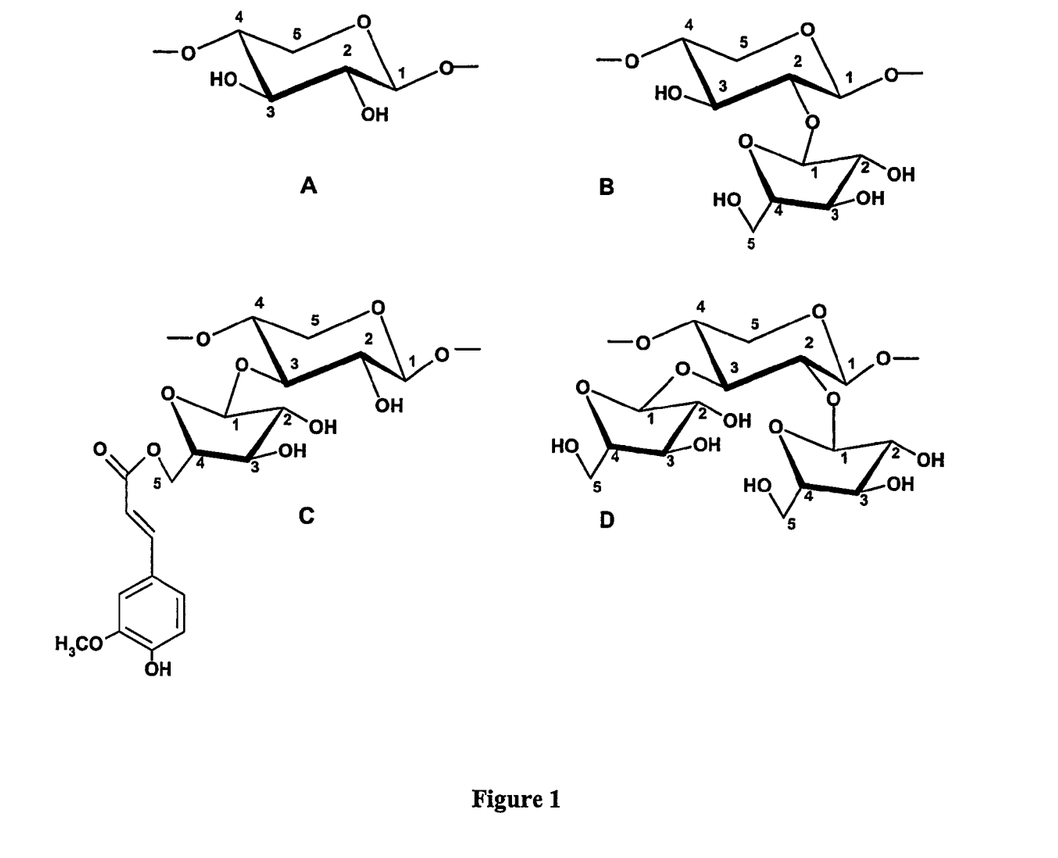
FIG. 1: Structural elements of arabinoxylans.

The invention relates to the positive effect on feed utilisation after supplementation of feed or food with given non-starch polysaccharides (NSP). NSP include a range of compounds possessing different physicochemical properties. Arabinoxylans are an important group of cereal NSP and are also referred to as pentosans, which consist of a main chain of beta-1,4-linked D-xylopyranosyl units to which O-2 and/or O-3 L-arabinofuranosyl units are linked. In a typical arabinoxylan unsubstituted, monosubstituted and disubstituted xylose residues occur (see FIG. 1). Arabinoxylans are either water-extractable or water-unextractable. The latter can be partially solubilised under alkaline conditions or by using enzymes and bind large amounts of water. The water-extractable arabinoxylans have an extraordinary viscosity forming potential. In general, their molecular masses are very high (up to 800,000 Dalton) depending on the source and extraction method. Despite the fact that they are only minor constituents, they are important for the functionality of cereals in biotechnological processes such as the production of wheat starch, pasta and beer, breadmaking and feed applications.

More in general, the nutritional effects of NSP in monogastric animals are diverse and, in some cases, extreme. It is, however, generally conceded that the major detrimental effects of NSP are associated with the viscous nature of these polysaccharides, their physiological and morphological effects on the digestive tract and the interaction with the microflora of the gut. The mechanisms include altered intestinal transit time, modification of the intestinal mucosa, and changes in hormonal regulation due to a varied rate of nutrient absorption (Vahouny 1982). The viscous properties of NSP and more particularly those of the high molecular mass, water extractable NSP, are a major factor in the anti-nutritive effect of NSP in monogastric diets.

This is illustrated by the findings of Choct and Annison (1992a) demonstrating that the concentration of waterextractable arabinoxylan in broiler diets is positively correlated with the relative depression in metabolisable energy, nitrogen retention, feed-conversion efficiency, and weight gain. Wheat diets containing 4% arabinoxylans decreased digestibility of starch, protein, and lipids by 14.6, 18.7, and 25.8%, respectively. Differences in content and composition of NSPs among barley or wheat varieties are associated with differential effects of these cereals on poultry productivity. Barley varieties can e.g. be classified as having a "high" or "low" contents of β-glucan, which is responsible for significant differences in biological responses when barley-based diets are fed to poultry (Campbell et al. 1989).

Adding microbial enzymes to wheat- and barley-based monogastric animal feeds to hydrolyze NSPs and reduce the negative effects of antinutritive factors, minimize variability, and therefore, improve ingredient value is now a commonplace practice. Indeed, while hydrolysis of arabinoxylan is facilitated by several types of endo- and exo-acting enzymes, the 1,4-β-D-xylanhydrolase, hereafter referred to as endo-xylanase (EC 3.2.1.8) clearly has a key role in the process, hence its use in many biotechnological processes in which cereals are used, such as in feed production.

However, the use of microbial enzymes in food and feed processing is based on empirism rather than on sound scientific insights. To be efficient it is often desirable that the enzymes are sufficiently impure to have other side effects so that they can act in synergy (Zyla et al 1999). On the other hand, enzymic degradation of feed arabinoxylans may as well create adverse effects that sometimes are greater than the effect of the original polymer (Zyla et al 1999). Dietary supplementation with enzymes which degrade xylans, arabinose and mannans, may e.g. generate degradation products that cause metabolic problems (Carre et al, 195; Iji, 1999; Naveed, 1999; Zyla et al, 1999a,b) or other adverse advents may occur due to the absorption and subsequent excretion of the monomers, and other compounds such as fatty acids (Savory 1992a, b, Care et al, 1995; Gdala et al, 1997; Zdunczyk et al, 1998, Kocher et al 1999).

The positive effect of the addition of NSP hydrolysing enzymes is mainly explained by the fact that anti-nutritive activity of NSP, such as the high viscosity of the digesta, is largely eliminated when the NSP polymers are cleaved into smaller fragments. However, it is largely unknown whether the degraded NSP fragments have any positive effect per se on the feed utilisation and growth performance of monogastric animals. It is generally accepted that part of rapidly fermentable oligosaccharides, such as those obtained after (enzymatic) fragmentation of the NSP, promote the growth of beneficial microflora in the gut, which is expected to lead to better health in pigs (Choct and Kocher, 2000). In poultry the role of dietary oligosaccharides is not clear. Although a prebiotic effect was described for some types of oligosaccharides (Spring et al., 2000), other authors argued that the presence of oligosaccharides in poultry diets increases fluid retention, hydrogen production and diarrhea, leading to an impaired utilisation of nutrients (Saini et al., 1989, Coon et al., 1990). Therefore, Choct and Kocher (2000) concluded it is difficult to say whether oligosaccharides are "nutrients" or "anti-nutrients". They attributed this uncertainty to the tremendous diversity of NSP-oligosaccharides that can potentially be derived from vegetable material. This diversity is also observed for the arabinoxylan oligosaccharides. In first instance the diversity is related to the source of the arabinoxylans. For example the arabinoxylan population in rice exhibits a very high degree of branching, indeed the ratio arabinose over xylose is about 1 in rice (Shibuya et al., 1985) while this is significantly lower in rye and wheat arabinoxylan (ratio arabinose over xylose ca. 0.5) (Maes et al., 1985). This difference in the degree of branching will influence both the efficiency of enzymatic fragmentation of the arabinoxylans as well as the nature and length of the obtained arabino-oligosaccharides. Furthermore, the nature of the fragmented arabinoxylans is determined by the fragmentation process applied. Depending on the applied process (enzymatic hydrolysis, acid hydrolysis, alkalic pretreatment) and the process parameters used (time, temperature, concentration of the arabinoxylan, concentration of the enzyme, pH, type of enzyme) different fragmentation products will be obtained, which differ in molecular weight, arabinose/xylose ratio, substitution pattern and ferulinic acid content.

SUMMARY OF THE INVENTION

According to the present invention, there is provided the use of low molecular mass arabinoxylan for the manufacture of a feed additive for the improvement of the production traits, and more particularly the growth performance and feed utilisation of monogastric animals.

In a preferred embodiment, said low molecular mass arabinoxylans are obtainable from natural sources, such as plant material and more preferably of cereals. They can be selected fractions of said natural arabinoxylans or can be obtained by depolymerisation or fragmentation of said natural arabinoxylans or they can be structural analogues produced by chemical, enzymic and/or physical processes.

For optimal improvement of growth performance, and feed utilisation of monogastric animals the feed additive of low molecular mass arabinoxylans of present invention may have molecular masses between 150 and 800,000 Dalton, preferably between 414 and 52,800 Dalton.

The feed additive of present invention may be a combination of different populations of low molecular mass arabinoxylans, which may be derived from different origin.

A further embodiment of the present invention is a feed containing the feed additive. The feed additive may thus be combined with other dietary components to produce cereal-based or non cereal-based feed. The feed additive can, however, also be provided to or consumed by the monogastric animal in the drinking water.

Moreover, date of present invention the person skilled in the art will understand that the addition of beneficial low molecular mass arabinoxylans is of particular interest in feeds containing no natural arabinoxylans, such as those feeds, which can not be improved by the addition of an endo-xylanase enzyme, such as maize based diets.

The person skilled in the art will also understand that the said feed additive is of particular interest in cereal based feeds, which have not been supplemented with an endoxylanase enzyme.

Furthermore, date of present invention the person skilled in the art will also understand that cereal-based feed, which can not readily be supplemented with bioactive endo-xylanase enzymes because of extreme (denaturing) processing conditions, such as extrusion (friction stress) and pelleting (high thermal stress), can easily be supplemented with effective amounts of low molecular mass arabinoxylans. Processed feed, comprising effective amounts of low molecular weight arabinoxylans, is thus another embodiment of present invention.

Yet another embodiment of present invention is a method of improving growth performance and feed utilisation of monogastric animals through the supplementation of their diets with the said compositions.

DETAILED ASPECTS OF THE INVENTION

Legends to the Drawings

A: unsubstituted D-xylopyranosyl residue. B: D-xylopyranosyl residue substituted at O-2 with an L-arabinofuranosyl moiety. C: D-xylopyranosyl residue substituted at O-3 with an L-arabinofura-nosyl moiety. D: D-xylopyranose residue substituted at O-2 and O-3 with L-arabinofuranosyl moieties. Structure C shows the linkage of ferulic acid to O-5 of an L-arabinofuranosyl residue.

DEFINITIONS

The term "cereal", as used in this application means any kind of grain used for food or feed and/or any grass producing this grain such as but not limited to wheat, milled wheat, barley, maize, sorghum, rye, oats, triticale and rice or combinations thereof. In one preferred embodiment, the cereal is a wheat cereal or a legume (such as for example pea or soy legumes).

The term "monogastric animals", as used in this application means animals that have not the multicompartmental stomach as in ruminants, the monogastric animals include poultry which use gastric juices for digestion and very young ruminants (e.g. young calfs) which have not yet developped the multicompartmental stomach.

The term "diet", as used in this application means food, feed and drink, which are regularly provided or consumed by an animal subject.

The term "feed", as used in this applications means nutriments in solid form comprising protein, carbohydrate, and fat used in the body of an organism to sustain growth, repair and vital processes as well as to furnish energy. These nutriments may also contain supplementary substances such as minerals, vitamins, and condiments. This term means also feed for livestock or a mixture or preparation for feeding livestock or other animals.

Illustrative Embodiment

The present invention describes the positive effect on the feed utilisation and growth performance of animals fed diets supplemented with a preparation comprising low molecular mass arabinoxylan fragments. Said low molecular mass arabinoxylan (LMW-arabinoxylan) are defined as a population of arabinoxylan molecules characterised in that for any given molecule the sum of arabinose and xylose monosaccharide moieties varies between 3 and 400, corresponding to molecular masses of 414 and ca. 52,800 Dalton, respectively.

The LMW-arabinoxylans are obtained from natural sources, such as plant material and more preferably of cereals. They can be selected fractions of said natural arabinoxylans or can be obtained by depolymerisation or fragmentation of said natural arabinoxylans or they can be structural analogues produced by chemical, enzymic and/or physical processes. In more preferred embodiments the LMW-arabinoxylans are obtained as by-products of the industrial starch-gluten separation process or after extraction of wheat, corn or rye brans. The corn brans can be obtained as a by-product of the corn-wet milling process (Hoseny, 1994).

Different feed additives comprising LMW-arabinoxylans were prepared and tested and are described in detail elsewhere in the text. The tested feed additives were characterised in that they comprised a suitable level of low molecular mass arabinoxylans. The feed additive of the invention comprises preferably more than 20% of low molecular mass arabinoxylans, more preferably more than 40% and most preferably more than 60%, for example 65%. However, the present invention also comprises the use of feed additives consisting of low molecular weight arabinoxylans.

Preferably, the feed additive is added to the feed, however the feed additive can also be administered to the animals as such or it can be suspended in the drinking water. In case the feed additive is added to the feed, the resulting feed comprises between 0.1 and 100 g of the said feed additive per kg of feed. In a more preferred embodiment, the feed comprises between 0.1 and 10 g of the said feed additive per kg of feed. In a most preferred embodiment, the feed comprises between 0.1 and 5 g of the feed additive per kg of food. In a preferred embodiment the enrichment of the feed with the feed additive results in a low molecular weight arabinoxylan-concentration in the feed between 0.1 and 10% (w/w). In a more preferred embodiment, the low molecular weight arabinoxylan-concentration in the feed varies between 0.1 and 5% (w/w). In a most preferred embodiment, the low molecular weight arabinoxylan-concentration in the feed varies between 0.1 and 1% (w/w).

The enrichment of feeds with low molecular arabinoxylans is of particular interest to enhance the productivity of monogastric farm animals, such as poultry (birds), horses, pigs, rabbits and fish amongst others. It was observed that the incorporation of the LMW-arabinoxilans in a cereal-based diet of broilers does not only lower the feed conversion but also enhances the growth of the broilers. In the same way, it was shown that the addition of LMW-arabinoxylans to the feed of fish leads to a stimulation of the growth of the fish.

The invention is further illustrated in the following examples:

EXAMPLES

Example 1

Efficacy of a Wheat Pentosan Concentrate in Barley-wheat Based Diets for Broilers The present balance trial establishes the effect on growth and feed conversion in broilers fed a barley-wheat based diet comprising a wheat pentosan concentrate (WPC).

Materials and Methods

1. Composition of the Arabinoxylan-containing Feed Additive:

A chicken feed was supplemented with Wheat Pentosan Concentrate (WPC), being a by-product of the industrial wheat starch-gluten separation process, which was obtained from Pfeifer&Langen (Dormagen, Germany). The chemical composition of WPC has been described in detail by Courtin and Delcour (1998). WPC is rich in arabinoxylan (ca. 50%) and water extractable protein material (30%). The remaining part mainly consists of arabinogalactan peptide (ca. 14%) and to a lesser extent, polymeric glucose (6%).

The molecular mass of the arabinoxylans in WPC varied between 150 and 800,000 Dalton, however, the largest part (60%) of the arabinoxylans had a molecular mass between 17,000 and 5,000 Dalton. The predominance of low molecular mass arabinoxylans in WPC is illustrated by the low viscosity of a 1.0% solution of WPC in water. Furthermore, the gelling capacity of a 1.0% WPC solution was non-existing (Courtin and Delcour, 1998).

2. Experimental Design:

Male broiler chicks (Ross 308) were used in this trial. Central water heating and infrared bulbs (1 per pen of 2 m$^2$) provided optimal house temperature. The lighting programme was L/D=23L:1D during the entire period. There was dynamic ventilation with lateral air entrance at one side and air extraction at the other side. The ventilation rate depended on the measured temperature and age of the broilers thereby (1) keeping the temperature as close as possible to the optimal temperature schedule and (2) minimising the moisture, $NH_3$ and $CO_2$-content of the inside air.

This trial was 2-factorially designed: "diet" (n=3) taking the factor "block" (n=5) into account. There were 5 replicates per treatment (3*5=15 pens). The total number of birds housed was (15*32)=480. The experimental diets were based on a combination of wheat and barley. The global composition of both starter (0-14 days) and grower (15-39 days) diet is given in table 1. Diclazuril (0.5% of Clinacox) was added at a dosage of 200 gram per ton of complete feed in order to prevent coccidiosis. All birds received feed (meal) and water (1 hanging drinker per pen) ad libitum.

Average pen weight was recorded at day old, 7, 14, 21, 28 and 39 days of age (incl. individual weights at 39 days of age). Feed intake was recorded for 0-7, 8-14, 15-21, 22-28, 29-39 days. Feed conversion, daily growth rate, bird-days and daily feed intake per bird were calculated for 0-7, 8-14, 15-21, 22-28, 29-39 and 0-7, 0-14, 0-28, 0-39 days. parameters were subjected to a 2-factorial analysis of variance "Diet (n=3) *Block (n=5)" and LSD-multiple range test. For the entire period, the effect of diet and block was investigated on the parameters mortality, production value by an ANOVA and LSD-multiple range test. (Statgraphics version 6.1, 1992; Snedecor and Cochran, 1989).

The broilers were vaccinated the 1st day of age against Newcastle (Hitchner, spray) and Bronchitis (H120, spray). At 16 days of age the vaccination against Newcastle was repeated with La Sota (Clone 30, drinking water). Twice daily, animals and housing facilities were inspected for the general health status, constant feed and water supply as well as temperature and ventilation, dead birds, and unexpected events. Daily mortality and culling were recorded for each pen on the general record sheet of the experimental unit. Dead birds were autopsied.

Results and Discussion

At arrival all broiler chickens were in good general health, which was confirmed by no need of any veterinary treatment. The quality of the chickens at arrival was checked in terms of microbial load and body weight. The microbial inspection showed no abnormalities. The average body weight at arrival was 43.3 g, which shows the high quality of the chickens. Total loss due to mortality and culling for the whole trial was 6.4% (=31 out of 480 chickens). Causes of death were related to early dehydration (20%), sudden death (35%), fibrinous polyserositis (25%) and culled dwarfs (20%).

The following tables give an appropriate and complete overview of the main zootechnical results and the corresponding statistical evaluation. The following legends are valid for tables 2-3:
  a) The treatment groups
  b) Statistics
    (1) ANOVA: with P-values significantly different at P: 0.05 (*), 0.01 () or 0.001 (*)
    (2) LSD m.r. test: averages (within each factor) with the same letter are not significantly different from each other at P: 0.05

In general, daily feed intake and daily weight gain as well increased with advancing age of the flock. On the other hand, feed conversion showed a different picture. There was an increase from week 1 to week 2. Then, feed conversion became better during week 3, mainly because of the change in diet, whereby the starter diet with a lower MEn was replaced by the grower diet with a higher MEn. For the subsequent weeks 4 & 5 feed conversion remained, however, constant. This latter observation was not expected; this pattern could be due to some compensatory effects.

For the first 2 weeks, daily feed intake of the 3 treatments was statistically not different from each other. The feed dietary supplementation with LMW arabinoxylan-containing wPC material, resulted in a significantly higher weight gain and significantly better feed conversion whereby the effect of the lower dosage was slightly better than that of the higher dosage.

A similar tendency was observed during week 3. However, during week 4, the highest feed intake was observed at the lower dosage. The response for weight gain followed the same picture since feed conversion was not affected by dietary manipulation. During the latter period "28-39", feed conversion was again clearly better after the dietary supplementation with no differences between both dosages.

For the combined periods, the dietary supplementation resulted in an improvement in feed conversion for period "1-14" and the entire period "1-39", but not for period "14-39". Weight gain was obviously higher after the dietary supplementation, with again a better response on the lower dosage in comparison with the higher dosage.

There were no significant differences in mortality (Table 3). Total loss was relatively moderate under the present experimental conditions. Production value was in line with the above mentioned findings concerning growth rate and feed conversion.

The findings in table 4 did not demonstrate a lower variability in final body weight after the dietary supplementation in comparison with the control treatment. This observation means that this type of additive might have a similar effect in all broilers irrespective of their physiological status.

The better food utilisation and growth observed in the broilers fed with the feed containing the WPC preparation is attributed to the high concentration of low molecular mass arabinoxylans in this preparation. However, chemical analysis of the WPC preparation showed the presence of arabinogalactan-peptides in the WPC preparation. Arabinogalactan peptides are an other class of cereal NSP. There are several structural models (Fincher et al, 1974; Strahm et al, 1981) for these relatively small molecules that have typical molecular masses of ca 22,000 Dalton and that typically contain 92% arabinogalactan and 8% peptide. Although positive effects of the addition of arabinogalactan-peptides to animal feeds have been reported on animal health and growth performance, it is highly unlikely that the effects observed in present experiments are related to the presence of arabinogalactan-peptide in the WPC material. Typically, wheat and barley contain about 0.3% arabinogalactan-peptide. Given that these cereals represent about 55% w/w of the experimental diets, it can be calculated that, before supplementation, the diet contains about 1.7 g of arabinogalactan-peptide, while the addition of WPC in a dose of 5 g WPC per kg of feed only adds 0.75 g of arabinogalactan-peptide. On the other hand, untreated barley and wheat contain less than 0.25 g low molecular mass arabinoxylans per kg of cereal, meaning that before supplementation the feed contains less than 0.12 g per kg feed, while the supplementation of the feed with WPC adds about 3 g of low molecular mass arabinoxylans per kg feed.

In order to gain further insight in this area, and to verify whether our view that the low molecular mass arabinoxylans were causing the effects observed, we designed an additional experimental set up which is described in example 2 and in which the effect of arabinogalactan peptide free low molecular mass arabinoxylan is tested.

Example 2

Efficacy of a Wheat Pentosan Concentrate, an Arabinogalactan-arabinoxylan Preparation, and an Arabinoxylan Preparation in Wheat Based Diets for Broilers The present balance trial establishes the efficacy of the title components in a wheat based diet for broilers from 0-14 days of age.

Materials and Methods

1. Composition of the Different Arabinoxvlan-containing Feed Additives:

Wheat Pentosan Concentrate (WPC) was the material described in Example 1.

Deproteinised WPC was prepared by dissolving 5.0 kg of WPC in 50 litres of water. We then added 10 kg of silica previously suspended in 75 litres of water and adjusted to pH 3.0 with 1.0 M HCl. Following mixing (15 min) the supernatant was removed by Buchner filtration and freeze dried. The resulting material (yield ca. 70%) is referred to as WPC-PROT and consisted of arabinoxylan (ca 67.5%), arabinogalactan peptide (ca. 16.3%), polymeric glucose (ca. 7.3%), protein (ca. 4.8%) and water (ca 4.0%). The molecular weight profile showed molecular mass distributions comparable to those of WPC.

Bran low molecular weight arabinoxylans (BRAN-LM-WAX) consisted of ca. 63.8% arabinoxylan, ca. 13% water, 10.5% of ash, 4.8% of protein and trace levels of galactose and glucose. The molecular weight profile showed molecular masses lower than those of WPC with a peak centered at 2,100 Da. This material was obtained from purified wheat bran. Purified wheat bran was prepared by adding 105 litres of water to 15 kg of wheat bran, heating to 75° C., adding 15 ml of Termamyl, incubating 90 min at 85° C., cooling to 50° C., removing the supernatant, adding 100 litres of water, adding 2,250 litres Neutrase, incubating 240 min at 50° C., storing overnight at 35° C., removing the extract, adding 100 litres of water and heating at 90° C. for 30 min to inactivate the enzymes used. The insoluble residue obtained in this way is referred to as purified wheat bran. The purified wheat bran obtained was suspended in 80 litres of water at 30° C. Bacillus subtilis endoxylanase (Grindamyl, Danisco H640, 60 g) were added. The mixture was then incubated at 35° C. for 24 min. It was then filtered. The filtrate was boiled to inactivate the enzyme and to concentrate the extract (final volume 30 litres). BRAN-LMWAX is the material obtained following freeze drying of the material (yield 1.2 kg).

2. Experimental Design:

The experimental design was very comparable to that of Example 1, except for the fact that we now chose a wheat-rich diet (see Table V) and that the experiment was run for two weeks only. Indeed, Example 1 indicates that most of the effects from WPC were already clear within the first 2 weeks.

This trial was 2-factorially designed: "diet" (n=6) taking the factor "block" (n=5) into account. There were 5 replicates per treatment (6*5=30 pens). The total number of birds housed was (40*32)=1280. The experimental diets were based on wheat as the main cereal. The global composition of the starter feed (0-14 days) is given in table 1.

Average pen weight was recorded at day old, 7, and 14 days. Feed intake was recorded for 1-14 days. Feed conversion, daily growth rate, bird-days and daily feed intake per bird were calculated. All zootechnical parameters were subjected to a 2-factorial analysis of variance "Diet (n=6)*Block (n=5)" and LSD-multiple range test. The effect of diet and block was investigated on the parameters mortality, and production value by an ANOVA and LSD-multiple range test. (Statgraphics version 6.1, 1992; Snedecor and Cochran, 1989).

Results and Discussion

At arrival all broiler chickens were in good general health, which was confirmed by no need of any veterinary treatment. The quality of the chickens at arrival was checked in terms of microbial load and body weight. The microbial inspection at the Provincial Lab showed no abnormalities. The average body weight at arrival was 43.6 g, which shows the high quality of the chickens.

Total loss due to mortality and culling for the whole trial was 6.3% (=81 out of 1280 chickens). Causes of death were related to early deshydratation (20%), sudden death (20%), fibrinous polyserositis (30%) and culled dwarfs (30%).

The following tables are giving an appropriate and complete overview of the main zootechnical results and the corresponding statistical evaluation. The following legends are valid for tables 6-7:
a) The treatment groups
b) Statistics
(3) ANOVA: with P-values significantly different at P: 0.05 (*), 0.01 () or 0.001 (*)
(4) LSD m.r. test: averages (within each factor) with the same letter are not significantly different from each other at P: 0.05

The addition of WPC resulted in an improved feed conversion. The difference in response between diets 2 & 4 is not logic since both were with the same dosage of WPC. The additives WPC-PROT & BRAN-LMWAX had a more beneficial effect on feed conversion than WPC (at a dosage resulting in similar levels of low molecular weight arabinoxylan as is the case with the lowest WPC dosage). In general weight gain for the supplemented treatments was higher than the control (significant for diets 3, 4, 5 & 6) because of the beneficial effects of these additives on both feed conversion (significant for diets 4, 5, & 6) and feed intake (significant for diets 4, 5, & 6).

There were some significant differences in animal losses (Table 7), being however not related to the dietary combination. Total loss was relatively moderate under the present experimental conditions. Production value was only partly (because of the interacting effect of animal losses) in line with the above mentioned responses with a maximal increase of about 7%.

Example 3

Effect of the Supplementation of a Fish Feed with a Wheat Pentosan Concentrate on the Growth of African Catfish The experiment described below investigated the effect of the addition of WPC material to an experimental fish feed on the growth performance of juvenile African catfish fed said feed.
Materials & Methods In this trial 180 Juvenile African catfish (Fleuren, Someren, NL), distributed over 6 individual tanks, were used. The fish were kept at 25° C. in a flow through system fed with tap water. The control groups (3 groups comprising 30 fish each) were fed a control diet, while the experimental groups (3 groups comprising 30 fish each) were fed the same feed to which 7.42 g WPC material was added per kg of feed. The diets were based on a combination of Biomeerval (ME 4.5-11; Trouw, NL) and CARP FEED (N°2230 Joosen-Luyckx AquaBio, B). One part of ground Biomeerval was mixed with one part of ground CARP FEED, thereafter, water was added to the feed powder and the obtained paste was extruded and dried. The average particle size of the thus obtained feed pellets was 3 mm.

Figure 2:
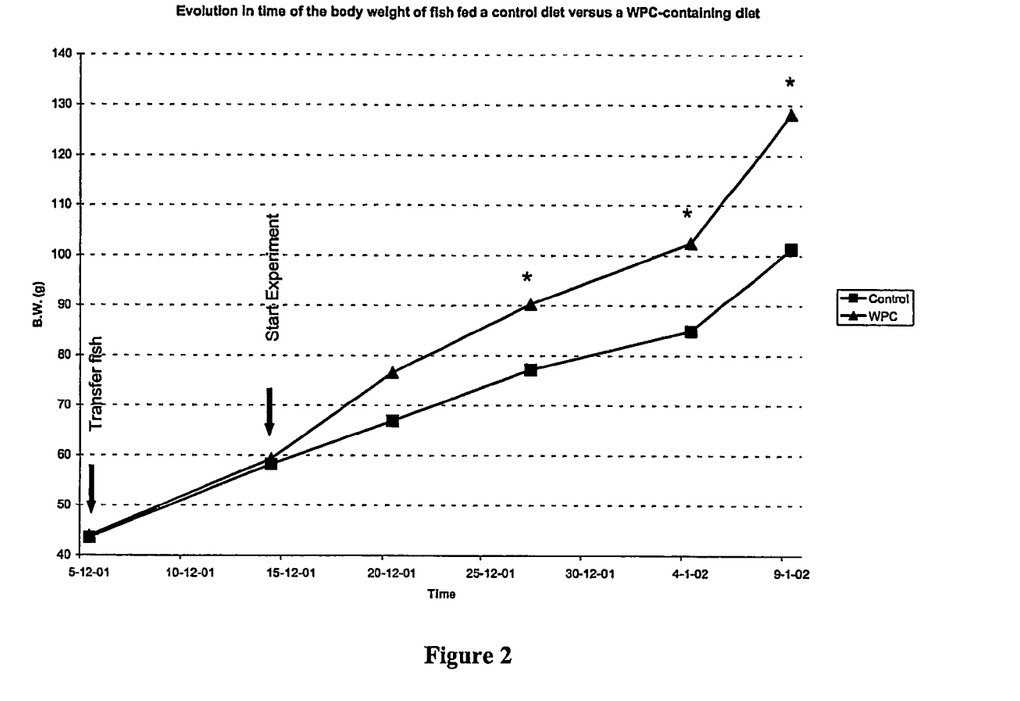
FIG. 2: Evolution in time of the body weight of the fish. The animals either fed a feed containing WPC-material (▼) or a control feed (■). Each data point represent the average body weight of 90 African catfish.

During the first 9 days after the transfer of the animals to the experimental tanks all fish were fed the control diet. The animals were weighed at the moment of transfer to the experimental tanks, at the start of the trial as well as 7, 14, 22 and 26 days thereafter. Throughout the experiment the daily amount of feed supplied to the fish corresponded to 3% of their body weight. The body weight data were subjected to ANOVA followed by a Tukey HSD test.
Results & Discussion All fish were in good general health at the start of the experiment and remained in good condition throughout the experiment, which was illustrated by the fact that no mortality occurred during the experiment. In the period between the transfer of the fish to the experimental tanks and the start of the trial, the growth rate was similar in both groups (FIG. 2). However, after the start of the experiment the growth rate of the fish fed the WPC-containing feed was higher than in the control group, resulting in a significantly higher average body weight of the WPC fed fish on days 14, 21 and 25.

REFERENCES

Campbell, G. L.; Rossnagel, B. G.; Classen, H. L.; Thacker, P. A. 1989. Genotypic and environmental differences in extract viscosity of barley and their relationship to its nutritive value for broiler chickens. Animal Feed Science and Technology, 226, 221-230

Carre, B.; Gomez, J. and Chagneau, A. M. Contribution of oligosaccharide and polysaccharide digestion, and excreta losses of lactic acid and short chain fatty acids, to dietary metabolisable energy value in broiler chickens and adult cockerels. Br. Poultry. Sci., 36:611-629, 1995.

Choct, M. and Annison, G., Br. Poult. Sci. 33: 821, 1992.

Choct M. and Kocher A. Non-starch carbohydrates: Digestion ans its secondaary effects in monogastrics. Proceedings of 24th Annual Meeting of the Nutrition Society of Australia, Fremantle, Perth, December 2000, pp 31-38.

Coon C. N., Leske K. L., Akavanichan O. and Cheng T. K. Effect of oligosaccharide-free soybean meal on true metabolizable energy and fiber digestion in adult roosters. Poult Sci 1990, 69, 787-793.

Courtin, C. M., Delcour, J. A., Physico-chemical and breadmaking properties of low molecular weight wheat derived arabinoxylans, J. Agric. Food Chem., 1998, 46, 4066-4073.

Fincher, G. B., Stone, B. A., Clarke, A. E., Arabinogalactan-proteins: structure, biosynthesis, and function, Ann. Rev. Plant Physiol., 1983, 34, 47-70.

Gdala, J.; Jansman .J. M.; Buraczewska, L.; Huisman, J. and van Leeuwe, P. The influence of alpha-galactosidase supplementation on the ileal digestibility of lupin seed carbohydrates and dietary protein in young pigs. Anim. Feed Sci. Tech., 67:115-125, et al, 1997.

Hoseny, R. C. Principals of cereal science and technology. AACC, St. Paul, Minn., USA, 1994. Iji, P. A. The impact of cereal non-starch polysaccharides on intestinal development and function in broiler chickens. Wld.'s Poult. Sci. J., 55:375-387.1999.

Kocher, A. Hughes, R. J. and Choct, M. Lupin oligosaccharides: nutrients and anti-nutrients? Proc. Of Australian Poultr. Sci. Symp.; Sydney, Australia, 1999.

Naveed, A. The effect of enzyme supplementation of UK grown lupin seeds on growth and nutrient digestibility in broilers. MSc. Thesis, University of Aberdeen, March, 1999.

Saini, H. S. Legum seed oligosaccharides. Prc Rec Adv Res Antinutritive Fact Legume Seed, Wageningen 1989, 329-341.

Savory, C. J. Enzyme supplementation, degradation and metabolism of three U-14C-labelled cell-wall substrates in the fowl. Br. J. Nutr, 67:91-102.1992 b.

Savory, C. J. Gastro-intestinal morphology and absorption of monosaccharides in fowls conditioned to different types and levels of dietary fibre, 1992a.

Snedecor, G. W., and W. G. Cochran, 1989. Statistical methods (8th edn.). Iowa State University Press. Ames, Iowa, USA.

Spring P., Wenk C., Dawson K. A. and Newman K. E. The effects of dietary mannaoligosaccharides on cecal parameters and the concentrations of enteric bacteria in the ceca of salmonella-challenged broiler chicks. Poult Sci, 20001 79, 205-211.

Statgraphics version 6.1, 1992. Reference Manual. Statistical Graphics Corporation (Rockville, Md., USA).

Strahrm, A., Amado, R., Neukom, H., Hydroxyproline-galactoside as a protein-polysaccharide linkage in a water soluble arabinogalactan-peptide from wheat endosperm, Phytochem, 1981, 20, 1061-1063.

Vahouny, G. V., Fed.Proc. 41:2801, 1982.

Zdunczyk, Z.; Juskiewicz, J., Frejnagel S. and Gulewicz, K. Influence of alkaloids and oligosaccha-rides from white lupin seeds utilisation of diets by rats and absorption of nutrients in the small intestine. Anim. Feed Sci. Tech. 72:143-154., 1998.

Zyla, K., Gogal, D.; Koreleski, J.; Swiatkiewicz, S and Ledoux, D. R. Simultaneous application of phytase and xylanase to broiler feeds based on wheat: feeding experiment with growing broilers, 1999b.

Zyla, K., Gogal, D.; Koreleski, J.; Swiatkiewicz, S. and Ledoux, D. R. Simultaneous application of phyatse and xylanase to broiler feeds based on wheat: in vitro measurements of phosphorus and pentose release from wheat and wheat-based feeds. J. Sci. Foods Agric., 79:1832-1840, 1999a.

TABLE 1

Composition of the experimental wheat-barley diets (%)

| | Starter diet (0-14d) | Grower diet (15-39d) |
|---|---|---|
| Wheat | 38.09 | 36.34 |
| Barley | 19.55 | 19.05 |
| Full fat soybean HT | 2.86 | 7.62 |
| Soybean meal-48 | 9.64 | 3.16 |
| Soybean meal-44 | 15.59 | 17.13 |
| Yellow corn | 4.76 | 4.76 |

TABLE 1-continued

Composition of the experimental wheat-barley diets (%)

| | Starter diet (0-14d) | Grower diet (15-39d) |
|---|---|---|
| Rendered animal fat | 5.31 | 6.67 |
| Soybean oil | — | 1.16 |
| Bicaphosphate 18/25 | 1.70 | 1.58 |
| Limestone white | 0.89 | 0.86 |
| Salt fine dry | 0.29 | 0.30 |
| L-lysine•HCl | 0.22 | 0.25 |
| DL-Methionine | 0.14 | 0.15 |
| L-threonine | 0.01 | 0.02 |
| Vitamin + Trace Element Premix | 0.95 | 0.95 |
| Sum | 100.00 | 100.00 |
| Nutrient composition | | |
| MEn, MJ/kg | 11.24 | 12.00 |
| C. protein, % | 20.00 | 19.08 |
| Lys., % | 1.19 | 0.16 |
| S amino acids, % | 0.81 | 0.79 |
| Ca, % | 0.91 | 0.86 |
| Pav., % | 0.44 | 0.41 |
| C. fat, % | 7.62 | 10.89 |
| C18:2, % | 1.46 | 2.60 |

The set-up results in 3 diets and 5 replicates for each wheat-barley based diet.

| | Treatment | |
|---|---|---|
| Diet | WPC: dosage 1 | WPC: dosage 2 |
| 1 control | − | − |
| 2 | + | − |
| 3 | − | + | dosage:
diet 1: 0.0 g WPC per kg feed
diet 2: 5.0 g WPC per kg feed
diet 3: 10.0 g WPC per kg feed The feedstuff composition is identical for each treatment within each phase, with exception for the dietary supplement, which was added on top.

Table 2 "a-h": The zootechnical performances with the wheat-barley based diets and corresponding statistical analyses for each period (incl. combined periods) (BW-xd: body weight on day x, g/d: gram/day).

TABLE 2a

Period 1-7 days

| | BW-1d g | BW-7d g | Daily feed intake g/d | Growth g/d | Feed conVersion |
|---|---|---|---|---|---|
| Anova(1) | | | | | |
| Diet (n = 3) | 0.47 | <0.001 | 0.24 | <0.001 | 0.006 |
| Block (n = 5) | 0.94 | 0.24 | 0.24 | 0.13 | 0.28 |
| LSD m.r. test(2) | | | | | |
| Diet | | | | | |
| 1 | 43.2 a | 129 b | 17.2 a | 12.3 b | 1.395 b |
| 2 | 43.7 a | 144 a | 18.2 a | 14.3 a | 1.272 a |
| 3 | 43.0 a | 139 a | 17.6 a | 13.7 a | 1.285 a |
| LSD(P: 0.05) | 1.4 | 5 | 1.3 | 0.7 | 0.069 |

TABLE 2b

Period 7-14 days

|  | BW-7d g | BW-14d g | Daily feed intake g/d | Growth g/d | Feed conversion |
|---|---|---|---|---|---|
| Anova(1) |  |  |  |  |  |
| Diet (n = 3) | <0.001 | 0.001 | 0.35 | <0.001 | 0.01 |
| Block (n = 5) | 0.24 | 0.07 | 0.26 | 0.07 | 0.53 |
| LSD m.r. test(2) |  |  |  |  |  |
| Diet |  |  |  |  |  |
| 1 | 129 b | 309 c | 45.6 a | 25.7 c | 1.777 b |
| 2 | 144 a | 355 a | 47.2 a | 30.2 a | 1.564 a |
| 3 | 139 a | 338 b | 46.2 a | 28.4 b | 1.627 a |
| LSD(P: 0.05) | 5 | 12 | 2.5 | 1.4 | 0.126 |

TABLE 2c

Period 14-21 days

|  | BW-14d g | BW-21d g | Daily feed intake g/d | Growth g/d | Feed conversion |
|---|---|---|---|---|---|
| Anova(1) |  |  |  |  |  |
| Diet (n = 3) | 0.001 | <0.001 | <0.001 | 0.03 | 0.08 |
| Block (n = 5) | 0.07 | 0.24 | 0.25 | 0.50 | 0.16 |
| LSD m.r. test(2) |  |  |  |  |  |
| Diet |  |  |  |  |  |
| 1 | 309 c | 616 c | 73.5 c | 43.8 b | 1.679 a |
| 2 | 355 a | 687 a | 81.5 a | 47.4 a | 1.721 ab |
| 3 | 338 b | 649 b | 77.2 b | 44.5 a | 1.736 b |
| LSD(P: 0.05) | 12 | 27 | 2.8 | 2.5 | 0.051 |

TABLE 2d

Period 21-28 days

|  | BW-21d g | BW-28d g | Daily feed intake g/d | Growth g/d | Feed conversion |
|---|---|---|---|---|---|
| Anova(1) |  |  |  |  |  |
| Diet (n = 3) | <0.001 | 0.008 | 0.04 | 0.16 | 0.78 |
| Block (n = 5) | 0.24 | 0.51 | 0.40 | 0.82 | 0.42 |
| LSD m.r. test(2) |  |  |  |  |  |
| Diet |  |  |  |  |  |
| 1 | 616 c | 1093 b | 113.0 b | 68.2 a | 1.658 a |
| 2 | 687 a | 1193 a | 118.5 a | 72.2 a | 1.640 a |
| 3 | 649 b | 1140 ab | 115.7 ab | 70.1 a | 1.652 a |
| LSD(P: 0.05) | 27 | 54 | 3.9 | 4.4 | 0.058 |

TABLE 2e

Period 28-39 days

|  | BW-28d g | BW-39d g | Daily feed intake g/d | Growth g/d | Feed conversion |
|---|---|---|---|---|---|
| Anova(1) |  |  |  |  |  |
| Diet (n = 3) | 0.008 | 0.009 | 0.42 | 0.17 | 0.10 |
| Block (n = 5) | 0.51 | 0.80 | 0.90 | 0.67 | 0.39 |
| LSD m.r. test(2) |  |  |  |  |  |
| Diet |  |  |  |  |  |
| 1 | 1093 b | 2008 b | 154.1 a | 91.5 a | 1.684 b |
| 2 | 1193 a | 2159 a | 158.2 a | 96.7 a | 1.638 ab |
| 3 | 1140 ab | 2107 a | 156.9 a | 96.7 a | 1.624 a |
| LSD(P: 0.05) | 54 | 84 | 6.9 | 6.6 | 0.059 |

TABLE 2f

Period 1-14 days

|  | BW-1d g | BW-14d g | Daily feed intake g/d | Growth g/d | Feed conversion |
|---|---|---|---|---|---|
| Anova(1) |  |  |  |  |  |
| Diet (n = 3) | 0.47 | 0.001 | 0.13 | <0.001 | <0.001 |
| Block (n = 5) | 0.94 | 0.07 | 010 | 0.09 | 0.44 |
| LSD m.r. test(2) |  |  |  |  |  |
| Diet |  |  |  |  |  |
| 1 | 43.2 a | 309 c | 31.4 b | 19.0 c | 1.652 b |
| 2 | 43.7 a | 355 a | 32.7 a | 22.3 a | 1.470 a |
| 3 | 43.0 a | 338 b | 31.9 ab | 21.1 b | 1.515 a |
| LSD(P: 0.05) | 1.4 | 12 | 1.4 | 0.8 | 0.069 |

TABLE 2g

Period 14-39 days

|  | BW-14d g | BW-39d g | Daily feed intake g/d | Growth g/d | Feed conversion |
|---|---|---|---|---|---|
| Anova(1) |  |  |  |  |  |
| Diet (n = 3) | 0.001 | 0.009 | 0.03 | 0.03 | 0.19 |
| Block (n = 5) | 0.07 | 0.80 | 0.79 | 0.85 | 0.85 |
| LSD m.r. test(2) |  |  |  |  |  |
| Diet |  |  |  |  |  |
| 1 | 309 c | 2008 b | 113.9 b | 68.0 b | 1.676 a |
| 2 | 355 a | 2159 a | 119.3 a | 72.1 a | 1.653 a |
| 3 | 338 b | 2107 a | 116.8 ab | 70.8 ab | 1.651 a |
| LSD(P: 0.05) | 12 | 84 | 3.7 | 3.0 | 0.031 |

TABLE 2h

Period 1-39 days

|  | BW-1d g | BW-39d g | Daily feed intake g/d | Growth g/d | Feed conversion |
|---|---|---|---|---|---|
| Anova(1) |  |  |  |  |  |
| Diet (n = 3) | 0.47 | 0.009 | 0.02 | 0.009 | 0.03 |
| Block (n = 5) | 0.94 | 0.80 | 0.61 | 0.79 | 0.96 |
| LSD m.r. test(2) |  |  |  |  |  |
| Diet |  |  |  |  |  |
| 1 | 43.2 a | 2008 b | 84.2 b | 50.4 b | 1.672 b |
| 2 | 43.7 a | 2159 a | 88.2 a | 54.3 a | 1.626 a |

TABLE 2h-continued

Period 1-39 days

|   | BW-1d g | BW-39d g | Daily feed intake g/d | Growth g/d | Feed con-Version |
|---|---|---|---|---|---|
| 3 | 43.0 a | 2107 a | 86.3 ab | 52.9 a | 1.631 a |
| LSD(P: 0.05) | 1.4 | 84 | 2.5 | 2.1 | 0.034 |

TABLE 3

Statistical analysis of the mortality and linked production parameters for the whole period (0-39d) with the wheat-barley based diet

|   | % Mortality or % Removed | Production Value |
|---|---|---|
| Anova(1) | | |
| Diet (n = 3) | 0.40 | 0.06 |
| Block (n = 5) | 0.72 | 0.51 |
| LSD m.r. test(2) Diet | | |
| 1 | 5.6 a | 284 b |
| 2 | 8.1 a | 307 a |
| 3 | 5.6 a | 306 a |
| LSD(P: 0.05) | 4.7 | 20 |

Production Value = (Daily weight gain(g) * (1 − Mortality (%/100)) * 10)/Feed Conversion

TABLE 4

The variation for body weight within each pen at 39 days of age with the wheat-barley based diet

|   | Treatment 1 | Treatment 2 | Treatment 3 |
|---|---|---|---|
| | Repl. 1 | Repl. 1 | Repl. 1 |
| Average, g | 1947 | 2243 | 2104 |
| St. dev., g | 3798 | 261 | 320 |
| Coeff. Var., % | 19.5 | 11.6 | 15.2 |
| | Repl. 2 | Repl. 2 | Repl. 2 |
| Average, g | 1948 | 2161 | 2117 |
| St. dev., g | 267 | 266 | 251 |
| Coeff. Var., % | 13.7 | 12.3 | 11.9 |
| | Repl. 3 | Repl. 3 | Repl. 3 |
| Average, g | 2150 | 2204 | 2066 |
| St. dev., g | 253 | 236 | 275 |
| Coeff. Var., % | 11.8 | 10.7 | 13.3 |
| | Repl. 4 | Repl. 4 | Repl. 4 |
| Average, g | 2039 | 2109 | 2111 |
| St. dev., g | 302 | 296 | 295 |
| Coeff. Var., % | 14.8 | 14.1 | 14.0 |
| | Repl. 5 | Repl. 5 | Repl. 5 |
| Average, g | 1989 | 2083 | 2136 |
| St. dev., g | 277 | 343 | 347 |
| Coeff. Var., % | 13.9 | 16.4 | 16.3 |

TABLE 5

Composition of the experimental wheat based diet (%)

|   | starter (0-2 w) |
|---|---|
| ingredients, % | |
| wheat | 50.00 |
| maize | 3.67 |
| soybean meal (48%) | 20.32 |
| HFF soybeans | 14.10 |
| R-animal fat | 7.36 |
| diCa phosphate (hydrated) | 1.78 |
| limestone | 0.84 |
| salt | 0.31 |
| Soy oil | 0.20 |
| DL-methionine | 0.21 |
| L-lysine•HCl | 0.16 |
| L-threonine | 0.05 |
| vit. & min. premix | 1.00 |
| nutrients | |
| MEn (MJ/kg) (broilers) | 12.50 |
| crude protein (%) | 21.50 |
| methionine (total, %) | 0.53 |
| meth. + cyst. (total, %) | 0.91 |
| lysine (total, %) | 1.25 |
| threonine (total, %) | 0.87 |
| calcium (%) | 0.92 |
| av. phosphorous (%) | 0.46 |

The set-up results in 6 diets and 5 replicates for each diet.

The set-up results in 6 diets and 5 replicates for each diet

| | | LMW-Arabinoxylan dietary supplement | | | |
|---|---|---|---|---|---|
| | | A | | | |
| | | dose 1 | dose 2 | B | C |
| wheat based diet | 1 control | − | − | − | − |
| | 2 | + | − | − | − |
| | 3 | − | + | − | − |
| | 4 | + | − | − | − |
| | 5 | − | − | + | − |
| | 6 | − | − | − | + |

A dosage 1 (diets 2, 4,): 5.0 g WPC per kg of feed
A dosage 2 (diet 3): 10.0 g WPC per kg of feed
B (diet 5): 3.7 g WPC-PROT per kg of feed
C (diet 6): 3.7 g BRAN-LMWAX per kg of feed

TABLE 6

The zootechnical performances and corresponding statistical analyses obtained with the wheat based diets

|   | BW-1d g | BW-14d G | Daily feed intake g/a/d | Growth g/a/d | Feed con-version |
|---|---|---|---|---|---|
| Anova(1) | | | | | |
| Diet (n = 6) | 0.41 | <0.001 | 0.02 | <0.001 | <0.001 |
| Block (n = 5) | 0.44 | 0.18 | 0.38 | 0.17 | 0.71 |
| LSD m.r. test(2) Diet | | | | | |
| 1 | 43.5 a | 352 d | 31.6 d | 22.0 d | 1.435 d |
| 2 | 44.0 a | 362 cd | 31.9 cd | 22.7 cd | 1.407 cd |
| 3 | 43.6 a | 372 c | 32.5 bcd | 23.4 c | 1.388 bcd |
| 4 | 43.6 a | 393 ab | 34.0 a | 25.0 ab | 1.362 abc |
| 5 | 43.3 a | 392 ab | 33.5 ab | 24.9 ab | 1.342 ab |

TABLE 6-continued

The zootechnical performances and corresponding
statistical analyses obtained with the wheat based diets

|   | BW-1d g | BW-14d G | Daily feed intake g/a/d | Growth g/a/d | Feed conversion |
|---|---------|----------|-------------------------|--------------|-----------------|
| 6 | 43.4 a  | 395 a    | 33.2 abc                | 25.1 a       | 1.321 a         |
| LSD(P: 0.05) | 0.7 | 17 | 1.5 | 1.2 | 0.048 |

TABLE 7

Statistical analysis of the mortality and linked production
parameters for the whole period (1-39d)

|   | % Mortality or % Removed | Production Value |
|---|--------------------------|------------------|
| Anova(1) | | |
| Diet (n = 6) | 0.20 | 0.61 |
| Block (n = 5) | 0.51 | 0.44 |
| LSD m.r. test(2) | | |
| Diet | | |
| 1 | 6.9 ab | 272 a |
| 2 | 6.8 ab | 270 a |
| 3 | 6.2 ab | 283 a |
| 4 | 5.6 ab | 282 a |
| 5 | 10.6 b | 267 a |
| 6 | 10.6 b | 278 a |
| LSD(P: 0.05) | 6.3 | 26 |

Production Value = (Daily weight gain(g) * (1 − Mortality(%/100)) * 10)/Feed Conversion

The invention claimed is:

1. A method for improving the weight gain and/or feed utilisation of monogastric animals, which comprises incorporating into the feed of said animals between 0.1 and 10% (w/w) of low molecular weight arabinoxylans per kg of feed, said low molecular weight arabinoxylans having a molecular mass between 414 and about 52,800 Da.

2. The method according to claim 1 which comprises incorporating into the feed from 1 to 50 g of low molecular weight arabinoxylans per kg of feed.

3. The method according to claim 1, which comprises incorporating into the feed 1 to 10 g of low molecular weight arabinoxylans per kg of feed.

4. The method according to claim 1, wherein said monogastric animals are selected from the group consisting of poultry, turkeys, pigs, piglets, calves, horses, and fish.

5. The method according to claim 1, wherein the feed comprises more than 25% by weight of cereal material.

6. The method according to claim 5, wherein said cereal material is selected from the group consisting of barley, rye, triticale, and wheat.

7. A method for improving the weight gain and/or feed utilization of monogastric animals, which comprises the addition to the feed of said monogastric animals of a nutriment additive comprising at least 40% (w/w) of low molecular weight arabinoxylans having a molecular mass between 414 and about 52,800 Da.

8. The method according to claim 7, which comprises the addition of a nutriment additive comprising 65% w/w of low molecular weight arabinoxylans having a molecular mass between 414 and about 52,800 Da to the feed of said animals.

9. The method according to claim 7, which comprises the addition of a nutriment additive comprising 50% w/w of low molecular weight arabinoxylans, the largest part of which have a molecular mass between 17,000 and 5,000 Da, to the feed of said animals.

10. The method according to claim 7, which comprises the addition of a nutriment additive comprising 63.8% w/w of low molecular weight arabinoxylans, the molecular weight profile of which shows a peak at 2,100 Da.

11. A method for feeding monogastric animals, comprising feeding said animals with a feed comprising more than 25% w/w of cereals and, in addition, 0.1 to 10% (w/w) of low molecular weight arabinoxylans per kg of feed, said low molecular weight arabinoxylans having a molecular mass between 414 and about 52,800 Da.

12. The method of claim 11, wherein the amount of low molecular weight arabinoxylans is between 0.1 to 50 g per kg of feed.

13. The method of claim 11, wherein the amount of low molecular weight arabinoxylans is between 0.1 to 10 g per kg of feed.

14. A method for feeding monogastric animals, comprising providing said animals with a feed comprising more than 25% w/w of cereals and with a drink comprising low molecular weight arabinoxylans, said low molecular weight arabinoxylans having a molecular mass between 414 and about 52,800 Da.

15. The method according to claim 7, which comprises the addition of a nutriment additive comprising 70% w/w of low molecular weight arabinoxylans having a molecular mass between 414 and about 52,800 Da to the feed of said animals.

16. The method according to claim 7, which comprises the addition of a nutriment additive comprising 85% w/w of low molecular weight arabinoxylans having a molecular mass between 414 and about 52,800 Da to the feed of said animals.

17. A method for improving the weight gain and/or feed utilisation of monogastric animals, which comprises incorporating into the feed of said animals between 0.01 and 10% (w/w) of low molecular weight arabinoxylans per kg of feed, said low molecular weight arabinoxylans having a molecular mass between 414 and about 52,800 Da.

18. The method according to claim 17 which comprises incorporating into the feed from 0.1 to 30 g of low molecular weight arabinoxylans per kg of feed.

19. The method according to claim 17, which comprises incorporating into the feed 5 to 10 g of low molecular weight arabinoxylans per kg of feed.

20. The method according to claim 17, wherein said monogastric animals are selected from the group consisting of poultry, broiler chickens, turkeys, pigs, piglets, young calves, horses, and fish.

21. The method according to claim 17, wherein the feed comprises cereal material.

22. The method according to claim 21, wherein said cereal material is selected from the group consisting of barley, rye, triticale, and wheat.

* * * * *

UNITED STATES PATENT AND TRADEMARK OFFICE
CERTIFICATE OF CORRECTION

| | | |
|---|---|---|
| PATENT NO. | : 8,623,402 B2 | Page 1 of 1 |
| APPLICATION NO. | : 10/487184 | |
| DATED | : January 7, 2014 | |
| INVENTOR(S) | : Delcour | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this
Nineteenth Day of May, 2015

Michelle K. Lee
*Director of the United States Patent and Trademark Office*